United States Patent
Schoelling et al.

[11] Patent Number: 5,502,281
[45] Date of Patent: Mar. 26, 1996

[54] CABLE SLEEVE OF PLASTIC COMPOSED OF A SLOTTED SOCKET PIPE AND SEAL MEMBERS AT THE FACE END

[75] Inventors: Rainer Schoelling, Herdecke; Detlef Graefe; Hermann Klostermeyer, both of Hagen; Martin Greisinger, Iserlohn, all of Germany

[73] Assignee: RXS Schrumpftechnik-Garnituren GmbH, Hagen, Germany

[21] Appl. No.: 240,136

[22] Filed: May 10, 1994

[30] Foreign Application Priority Data

May 27, 1993 [DE] Germany ............... 43 17 724.7

[51] Int. Cl.$^6$ ............................................. H02G 15/113
[52] U.S. Cl. ................... 174/92; 174/77 R; 174/93
[58] Field of Search ............................. 174/92, 93, 77 R

[56] References Cited

U.S. PATENT DOCUMENTS

| | | | |
|---|---|---|---|
| 3,663,740 | 5/1972 | Dellet | 174/92 |
| 4,262,167 | 4/1981 | Bossard et al. | 174/92 |
| 4,388,488 | 6/1983 | Wicek et al. | 174/92 |
| 4,538,021 | 8/1985 | Williamson, Jr. | 174/92 |
| 4,733,019 | 3/1988 | Pichler et al. | 174/92 |
| 4,808,772 | 2/1989 | Pichler et al. | 174/92 |
| 4,845,314 | 7/1989 | Pichler et al. | 174/92 |
| 4,861,946 | 8/1989 | Pichler et al. | 174/92 |
| 4,941,261 | 4/1990 | Tokumaru et al. | 174/92 |
| 5,004,868 | 4/1991 | Singor | 174/76 |

FOREIGN PATENT DOCUMENTS

| | | | |
|---|---|---|---|
| 0219071 | 10/1986 | European Pat. Off. | |
| 1147778 | 11/1957 | France | 174/92 |
| 2319956 | 11/1974 | Germany | 174/92 |
| 2742760 | 3/1979 | Germany | 174/92 |

*Primary Examiner*—Morris H. Nimmo
*Attorney, Agent, or Firm*—Hill, Steadman & Simpson

[57] ABSTRACT

A cable sleeve seal including a seamed pipe section and end-face seal members, with a sealing insert in sealing regions between the end face seal members and an inside of the pipe section and in a longitudinal seam of the pipe section, whereby the sealing insert is fixedly arranged in the sealing regions and the longitudinal seam. Moreover, the sealing insert merges from the sealing regions at the end face seal members into the longitudinal seam without interruption.

21 Claims, 3 Drawing Sheets

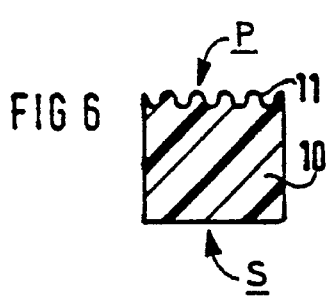
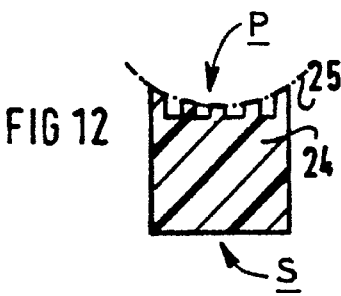
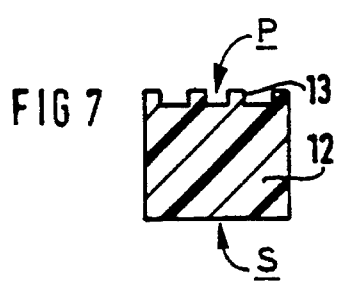
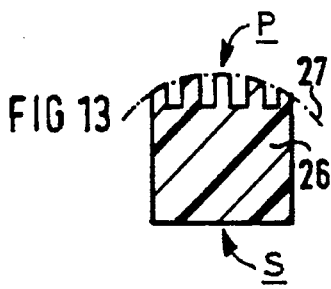
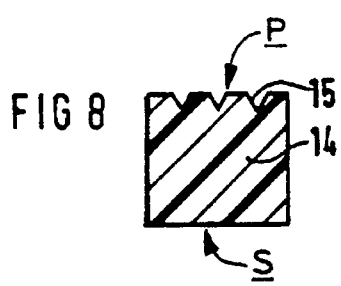
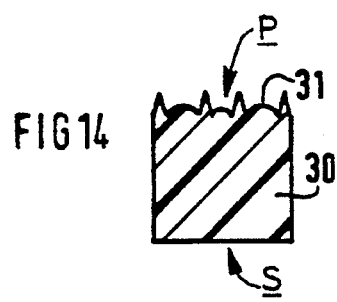
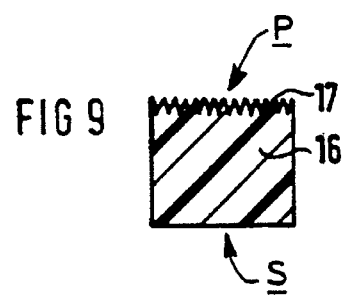
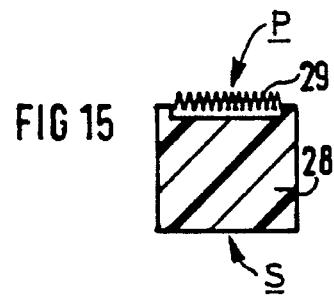
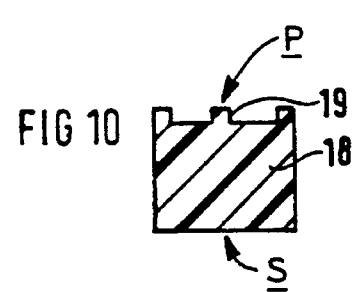
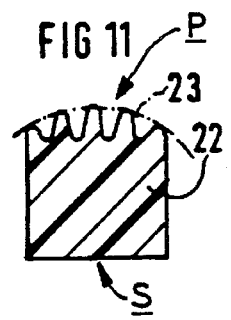
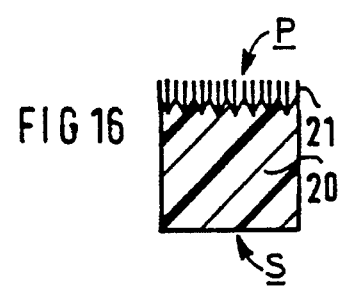

5,502,281

CABLE SLEEVE OF PLASTIC COMPOSED OF A SLOTTED SOCKET PIPE AND SEAL MEMBERS AT THE FACE END

BACKGROUND OF THE INVENTION

The invention is directed to a cable sleeve including a longitudinally seamed pipe with face-end seal members, and comprising an interconnected seal insert in the regions of the circumferential surfaces of the seal members and of the longitudinal seam closure. The cable sleeve is typically composed of plastic.

EP-A-0 219 071, corresponding to U.S. Pat. Nos. 4,733, 019 and 4,808,772, discloses a seal system for a cable sleeve. An endless sealing hose therein is inserted in the sealing regions of the longitudinal seam and between the end-face seal members and the socket pipe. However, special measures for supporting the seal system must be undertaken therein, particularly in the longitudinal seam sealing regions.

SUMMARY OF THE INVENTION

An object of the present invention is to improve seal systems in the sealing regions of the longitudinal seam and between the end-face seal members and the pipe. Particularly, it is an object to improve the assembly work, whereby the possible sources of error are reduced. The stated object is achieved with a cable sleeve having a single interconnected seal insert continuously and firmly arranged on the pipe, at least in the corresponding seal regions.

Advantages over the prior art are provided by the cable sleeve of the invention in that assembly work is facilitated, simplified, and time shortened since every cable sleeve already contains the appropriate seal system. Sources of assembly error that would be possible given previous assembly jobs are eliminated as a consequence of the fixed arrangement. These improvements become possible since the circumferential seals in the seal member regions and the longitudinal seal in the longitudinal seam region of the cable sleeve are combined to form an interconnected system, so that no parting locations occur in the seal system.

Since the seal insert in the longitudinal seam region is located between the longitudinal edges lying opposite one another reinforcing devices are no longer required within the cable sleeve. The seal insert is glued into or vulcanized into the corresponding regions.

The diameter of the pipe having applied sealing surface is slightly smaller than the diameter of the seal members. It is assured in this way that the pipe is pulled onto the seal members with the required closing pressure.

The thickness of the elastic sealant, preferably caoutchouc or silicone, amounts to 1 through 18 mm. As a result thereof, potential dimensional tolerances in the socket pipe or in the seal members can be compensated.

The seal insert can be effective if applied only in the respective region to be sealed; nonetheless, for example, the entire inside surface of the pipe can also be coated. Further, the sealing surfaces can be coated with fats, oils, for example silicone oil, in order to achieve better gliding behavior and lower closing forces when closing the pipe.

The fashioning of the seals and of the sealing regions can be arbitrarily varied. Some exemplary embodiments shall be set forth in greater detail below with reference to 16 figures.

BRIEF DESCRIPTION OF THE DRAWINGS

FIG. 6 is a cross sectional view through a sealing insert taken generally through VI—VI or VII—VII of FIG. 1 having a wavy surface.

FIG. 7 is a cross sectional view through a sealing insert having all-around elevations.

FIG. 8 is a cross sectional view through a sealing insert having notched portions.

FIG. 9 is a cross sectional view through a sealing insert having a zig-zag surface.

FIG. 10 is a cross sectional view through a sealing insert having elevations in unequal spacings.

FIG. 11 is a cross sectional view through a seal insert having a wavy surface, whereby the individual waves of are different heights.

FIG. 12 is a cross sectional view through a sealing insert having elevations whose heights are different, whereby the lowest elevations lie in the middle.

FIG. 13 is a cross sectional view through a sealing insert having elevations whose heights are different, whereby the lowest elevations lie at the edges.

FIG. 14 is a cross sectional view through a sealing insert having a surface with various shapes.

FIG. 15 is a cross sectional view through a sealing insert having an additional sealing insert.

FIG. 16 is a cross sectional view through a sealing insert having a surface constructed lamella-like.

DETAILED DESCRIPTION OF THE PREFERRED EMBODIMENTS

Figure 1:
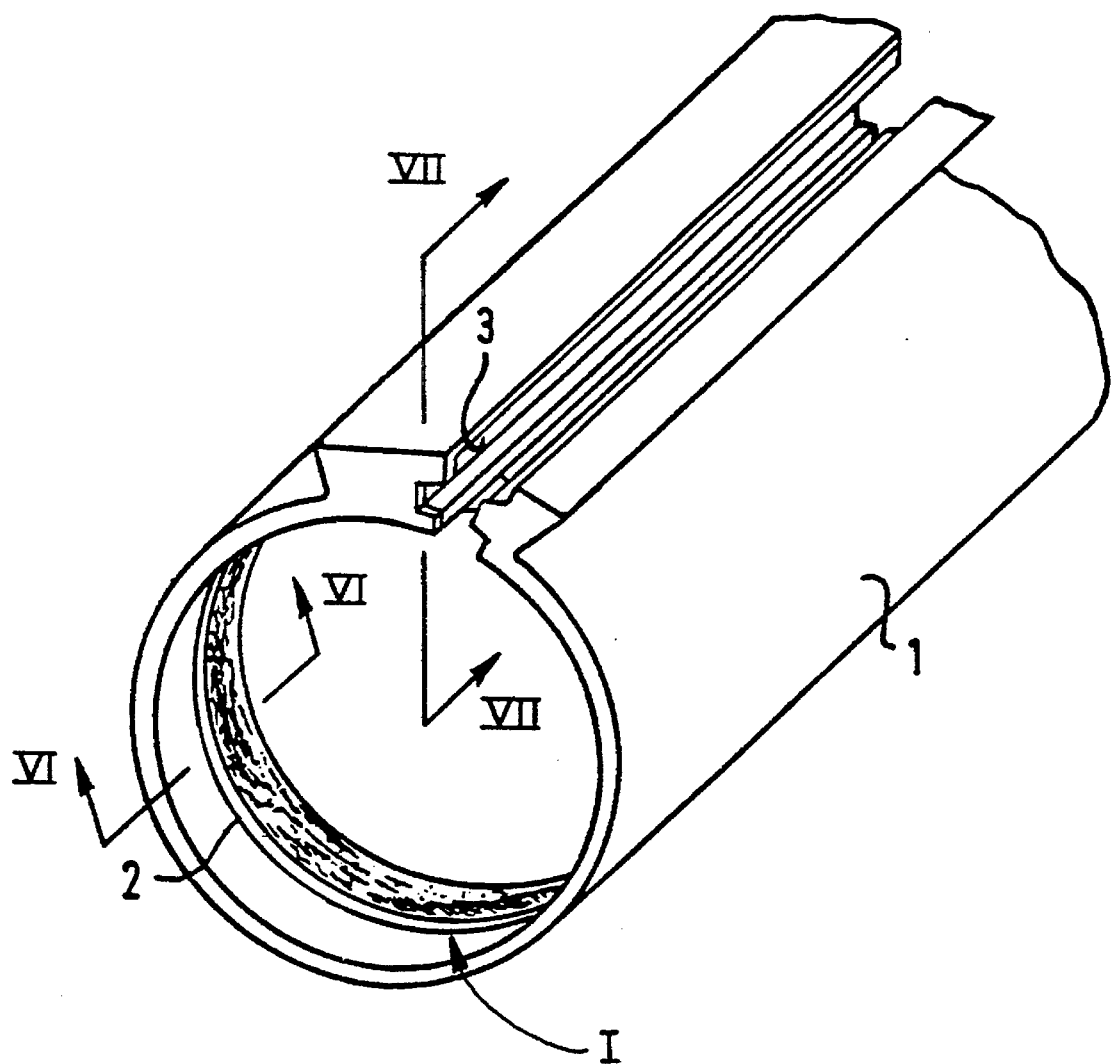
FIG. 1 is a partial perspective view of a cable sleeve showing sealing regions.

FIG. 1 illustrates a cable sleeve of the invention comprising a pipe 1 having a unitary, interconnected sealing insert I comprising a longitudinal sealing region 3 in the longitudinal seam of the pipe 1 and circumferential sealing regions 2 applied between the end-face seal member (not shown) and the pipe 1. These sealing regions 2 and 3 merge into one another without a joint, this having previously always lead to difficulties. The sealing region 2 is formed of an all around band that is firmly joined to the pipe 1 by gluing or vulcanizing, eliminating assembly work at the end face seals. The same is true of the farther-reaching longitudinal sealing region 3 that is fashioned as a channel and spring seal. The sealant in the regions 2, 3 employs plastic or elastic materials, so that tolerances can be compensated.

Figure 2:
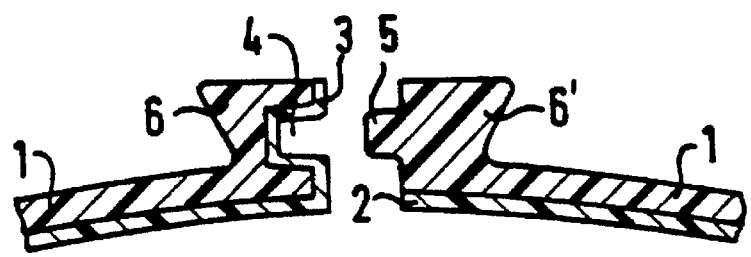
FIG. 2 is a partial sectional view of a longitudinal seal in a channel and spring embodiment.

In a sectional view, FIG. 2 illustrates the channel 4 and spring seal 5 of the pipe 1 that are formed in/on beads 6, 6' of the pipe 1. The beads proceed outwardly wedge-shaped. The sealant of the sealing region 2 of the seal member here proceeds outwardly into the channel 4 forming the longitudinal seal 3. The spring 5 lying opposite in the sealing region immerses into the sealing channel 4 in the assembled condition.

Figure 3:
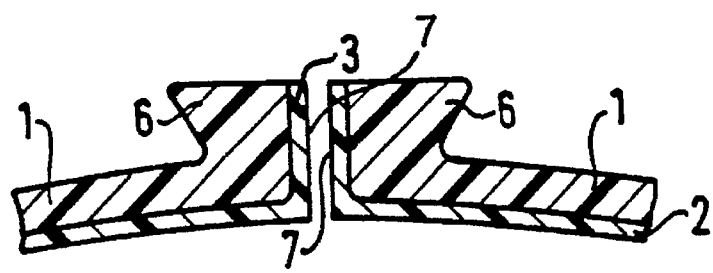
FIG. 3 is a partial sectional view of a longitudinal seal in a planar embodiment.

FIG. 3 illustrates a longitudinal sealing region 3 having planarly fashioned sealing surfaces 7 that are continuously covered with sealant up into the sealing regions 2 of the seal member.

Figure 4:
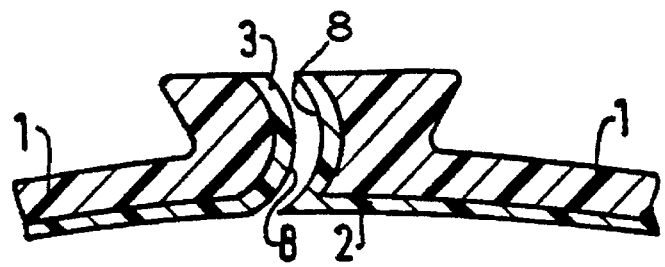
FIG. 4 is a partial sectional view of a longitudinal seal having rounded-off sealing surfaces.

FIG. 4 illustrates a modification of FIG. 3. Here, the sealing surfaces 8 comprise suitable, corresponding curve shapes, so that a certain alignment can already ensue when the sealing region 3 is joined.

Figure 5:
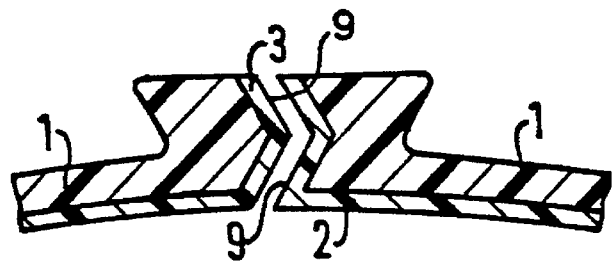
FIG. 5 is a partial sectional view of a longitudinal seal having angled-off sealing surfaces.

FIG. 5 shows a further version of the longitudinal seal region 3 which comprises angled-off surface regions 9.

FIGS. 6 through 16 show embodiments of the sealing profiles employed in the sealing regions 2 and 3 such as taken through VI—VI or VII—VII of FIG. 1. The profiled sealing surfaces yield, so to speak, multi-chamber systems, since the seal system is multiply subdivided into regions pressed against one another to a greater or lesser extent by respective elevations, interspaces, channels or the like. The sealing distance is lengthened and, thus, the sealing effect is improved at least on the basis of such an elevated surface fashioning with profiles taken transversely relative to the sealing direction. Irregularities and tolerances are thereby largely compensated, whereby the closing pressure can be reduced overall given the same sealing effect.

In all exemplary embodiments, the profiled surface P of the sealing insert is directed toward the corresponding sealing surface of the seal system. The respectively smooth surfaces S as shown in FIGS. 6–16 is secured such as by gluing or vulcanizing to the respective sealing region as shown in FIGS. 2–5.

FIG. 6 shows a sealing insert 10 having a wavy surface 11 in longitudinal or, respectively, circumferential direction.

FIG. 7 shows a sealing insert 12 whose surface comprises longitudinal or, respectively, circumferential, rectangular elevations 13 that are arranged at irregular intervals from one another.

FIG. 8 shows a sealing insert 14 having depressions 15 proceeding parallel that, for example, are triangularly fashioned, and extend longitudinally or, respectively, circumferentially.

The sealing insert 16 of FIG. 9, as a modification of FIG. 6, exhibits a multiply indented structure 17.

In FIG. 10, the sealing insert 18 is shown having longitudinal or, respectively, circumferential rectangular elevations 19 whose spacings from one another are greater than the width of the elevations 19.

In the embodiment of FIG. 11, the wavy fashioning 23 of the surface is less pronounced at the edges than in the middle of the sealing insert 22.

Given the sealing insert 24 of FIG. 12, a rectangular surface structure 25 is employed that is higher at the edges than in the middle.

FIG. 13 shows a fashioning as in FIG. 12; however, the elevations 27 here are smaller at the edges than in the middle of the sealing insert 26.

FIG. 14 indicates that the surface 31 of the sealing insert 30 can be provided with various profile shapes lying next to one another and parallel.

In the exemplary embodiment of a sealing insert 28 of FIG. 15, an additional longitudinal or, respectively, circumferential sealing insert 29 is introduced in the middle region; this, for example, can be composed of a different material and can comprise one of the aforementioned or an arbitrary surface structure.

FIG. 16 also shows a sealing insert 20 whose surface comprises a plurality of parallel lamellae 21, whereby additional basic profiles, a zig-zag profile shown, can also be employed.

Although the present invention has been described with reference to a specific embodiment, those of skill in the art will recognize that changes may be made thereto without departing from the scope and spirit of the invention as set forth in the appended claims.

We claim as our invention:

1. In a cable sleeve having a region having a pipe section with a circumferential surface adapted to mate with a seal member, and a longitudinal seam having mating seam edges, said circumferential surface and said seam edges respectively having sealing regions, the improvement comprising:
   a sealing insert firmly joined to said pipe section and arranged in said sealing regions of said circumferential surface and said seam edges; and
   wherein the sealing insert is vulcanized to the pipe section.

2. The Improvement according to claim 1, wherein said seal insert is unitary and continuous.

3. The improvement according to claim 1, wherein the sealing insert is composed of caoutchouc.

4. The improvement according to claim 1, wherein the sealing insert is composed of silicone.

5. The improvement of claim 1, wherein sealing surfaces of the sealing insert is coated with a lubricant.

6. The improvement according to claim 1, wherein the mating seam edges of the pipe section are fashioned as a channel and spring seal.

7. The improvement according to claim 1, wherein sealing surfaces of said sealing insert at the sealing regions are planarly fashioned.

8. The improvement according to claim 1, wherein sealing surfaces of said sealing insert at said seam edges have corresponding curved shapes.

9. The improvement according to claim 1, wherein a diameter of the pipe section is slightly smaller than the diameter of the end-face seal members.

10. The improvement according to claim 1, wherein the sealing insert is 1 through 18 mm thick.

11. The improvement according to claim 1, wherein the sealing insert includes at least one portion having a cross section with a seal surface providing a multi-chamber system, so that a plurality of seal chambers adjoining one another and proceeding parallel are formed.

12. The improvement according to claim 11, wherein said seal surface of the sealing insert is fashioned wavy transversely relative to a sealing direction.

13. The improvement according to claim 11, wherein said seal surface of the sealing insert comprises a plurality of elevations proceeding parallel to one another and transversely relative to a sealing direction.

14. The improvement according to claim 11, wherein said seal surface of the sealing insert comprises a plurality of notchings proceeding parallel to one another and transversely relative to a sealing direction.

15. The improvement according to claim 11, wherein said seal surface of the sealing insert comprises a plurality of indented rifled forms parallel to one another and transversely relative to a sealing direction.

16. The improvement according to claim 11, wherein the seal chambers are formed by protrusions in a sealing direction and spacings between protrusions are identical.

17. In a cable sleeve having a region having a pipe section with a circumferential surface adapted to mate with a seal member, and a longitudinal seam having mating seam edges, said circumferential surface and said seam edges respectively having sealing regions, the improvement comprising:

a sealing insert firmly joined to said pipe section and arranged in said sealing regions of said circumferential surface and said seam edges;

wherein the sealing insert includes at least one portion having a cross section with a seal surface providing a multi-chamber system, so that a plurality of seal chambers adjoining one another and proceeding parallel are formed; and wherein the seal chambers are formed by protrusions in a sealing direction and spacings between the protrusions are unequal.

18. In a cable sleeve having a region having a pipe section with a circumferential surface adapted to mate with a seal member, and a longitudinal seam having mating seam edges, said circumferential surface and said seam edges respectively having sealing regions, the improvement comprising:

a sealing insert firmly joined to said pipe section and arranged in said sealing regions of said circumferential surface and said seam edges;

wherein the sealing insert includes at least one portion having a cross section with a seal surface providing a multi-chamber system, so that a plurality of seal chambers adjoining one another and proceeding parallel are formed; and wherein lamellae that proceed parallel to one another and transversely relative to the sealing direction are arranged on a surface of the sealing insert.

19. In a cable sleeve having a region having a pipe section with a circumferential surface adapted to mate with a seal member, and a longitudinal seam having mating seam edges, said circumferential surface end said seam edges respectively having sealing regions, the improvement comprising:

a sealing insert firmly joined to said pipe section and arranged in said sealing regions of said circumferential surface and said seam edges; wherein the sealing insert includes at least one portion having a cross section with a seal surface providing a multi-chamber system, so that a plurality of seal chambers adjoining one another and proceeding parallel are formed; and wherein the seal chambers are formed by protrusions in a sealing direction and the protrusions have different heights.

20. In a cable sleeve having a region having a pipe section with a circumferential surface adapted to mate with a seal member, and a longitudinal seam having relating seam edges, said circumferential surface and said seam edges respectively having sealing regions, the improvement comprising:

a sealing insert firmly joined to said pipe section and arranged in said sealing regions of said circumferferential surface and said seam edges;

wherein the sealing insert includes at least one portion having a cross section with a seal surface providing a multi-chamber system, so that a plurality of seal chambers adjoining one another and proceeding parallel are formed; and wherein the seal chambers are formed by protrusions in a sealing direction and the protrusions have varying shapes.

21. In a cable sleeve having a region having a pipe section with a circumferential surface adapted to mate with a seal member, and a longitudinal seam having mating seam edges, said circumferential surface and said seam edges respectively having sealing regions, the improvement comprising:

a sealing insert firmly joined to said pipe section and arranged in said sealing regions of said circumferential surface and said seam edges;

wherein the sealing insert includes at least one portion having a cross section with a seal surface providing a multi-chamber system, so that a plurality of seal chambers adjoining one another and proceeding parallel are formed; and wherein said seal chambers are formed by a plurality of protrusions, said protrusions are applied as a separate component onto the sealing insert.

* * * * *